United States Patent [19]

Griffith et al.

[11] Patent Number: 5,010,658
[45] Date of Patent: Apr. 30, 1991

[54] HOLE PROFILE GAGING SYSTEMS

[75] Inventors: Jerry T. Griffith, Arlington; Scott J. Pleva, Irving, both of Tex.

[73] Assignee: LTV Aerospace and Defense Company, Dallas, Tex.

[21] Appl. No.: 274,985

[22] Filed: Nov. 22, 1988

[51] Int. Cl.⁵ .......................... G01B 5/20; G01B 7/28
[52] U.S. Cl. ...................................... 33/784; 33/836; 33/542
[58] Field of Search ............ 33/178 E, 178 F, 178 R, 33/836, 542, 783, 784, 827, 787, 789, 802, 501.03, 542.1, 555

[56] References Cited

U.S. PATENT DOCUMENTS

| | | | |
|---|---|---|---|
| 1,806,893 | 5/1931 | Cunningham | 33/827 |
| 2,581,495 | 1/1952 | Neff | 33/178 E |
| 2,621,416 | 12/1952 | Brenneke | 33/178 R |
| 2,771,685 | 11/1956 | Kinley | 33/178 F |
| 2,788,582 | 4/1957 | Middeler | 33/542 |
| 2,854,758 | 10/1958 | Owen | 33/178 F |
| 2,968,102 | 1/1961 | Raifsnider | 33/178 R |
| 2,996,806 | 8/1961 | Zieher | 33/783 |
| 3,426,437 | 2/1969 | Rebhun et al. | 33/174 |
| 3,757,569 | 9/1973 | O'Brien et al. | 73/104 |
| 3,872,602 | 3/1975 | Kennedy | 33/784 |
| 4,030,201 | 6/1977 | Possati et al. | 33/174 Q |
| 4,077,130 | 3/1978 | Possati | 33/174 L |
| 4,112,355 | 9/1978 | Gibson, Jr. et al. | 324/57 R |
| 4,290,204 | 9/1981 | Possati | 33/172 E |
| 4,306,455 | 12/1981 | Selleri | 33/178 E |
| 4,344,233 | 8/1982 | Albertazzi | 33/178 E |
| 4,412,385 | 11/1983 | Selleri | 33/178 E |
| 4,447,959 | 5/1984 | Watanabe et al. | 33/783 |
| 4,489,497 | 12/1984 | Schemel et al. | 33/172 E |
| 4,554,742 | 11/1985 | Freitag | 33/542 |
| 4,559,710 | 12/1985 | Koda | 33/783 |
| 4,604,809 | 8/1986 | Meyer, Jr. | 33/178 E |
| 4,625,429 | 12/1986 | Danielli | 33/504 |
| 4,653,196 | 3/1987 | Moschner et al. | 33/552 |

FOREIGN PATENT DOCUMENTS 7900666  9/1979  World Int. Prop. O. ............ 33/783

Primary Examiner—Thomas B. Will
Attorney, Agent, or Firm—C. Cotropia; J. M. Cate

[57] ABSTRACT

The present invention provides a hole profile gage comprising a probe that senses deviations in the contour of the inner surface of a bore while it is retracted through the bore. The profile gage includes a processing unit that samples the output from the probe, develops a profile for the hole, and evaluates whether the profile is within predetermined tolerance limits. In a preferred embodiment, the probe comprises a split ball probe coupled with a transducer. In use, the probe is retracted through the bore by a spring coupled with a damping device.

30 Claims, 2 Drawing Sheets

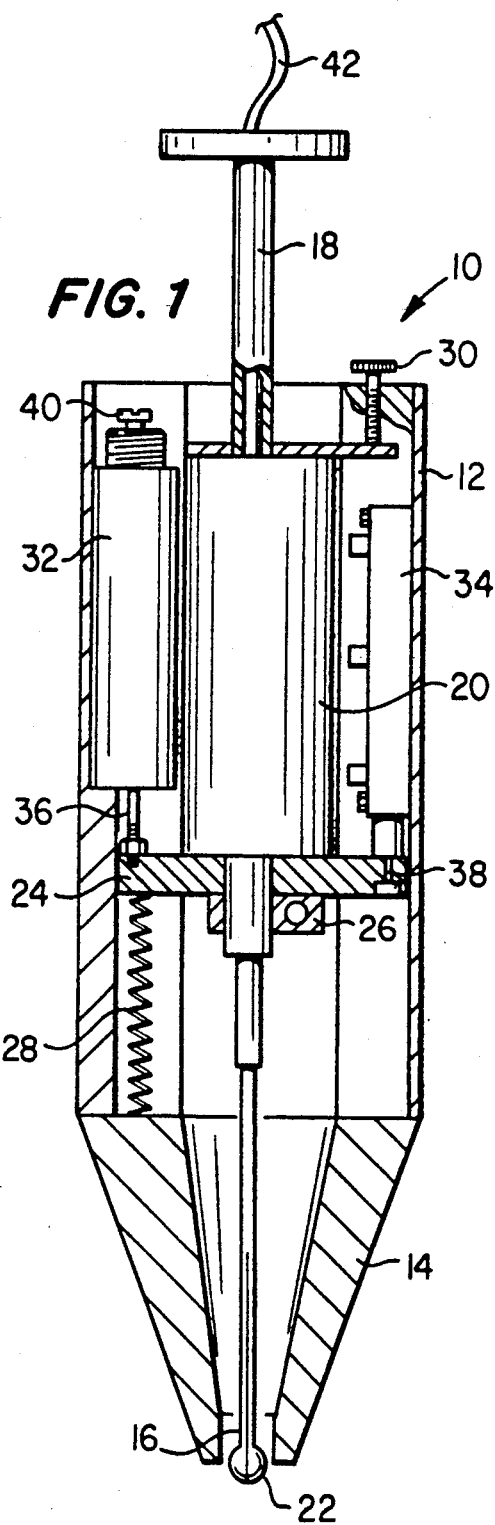
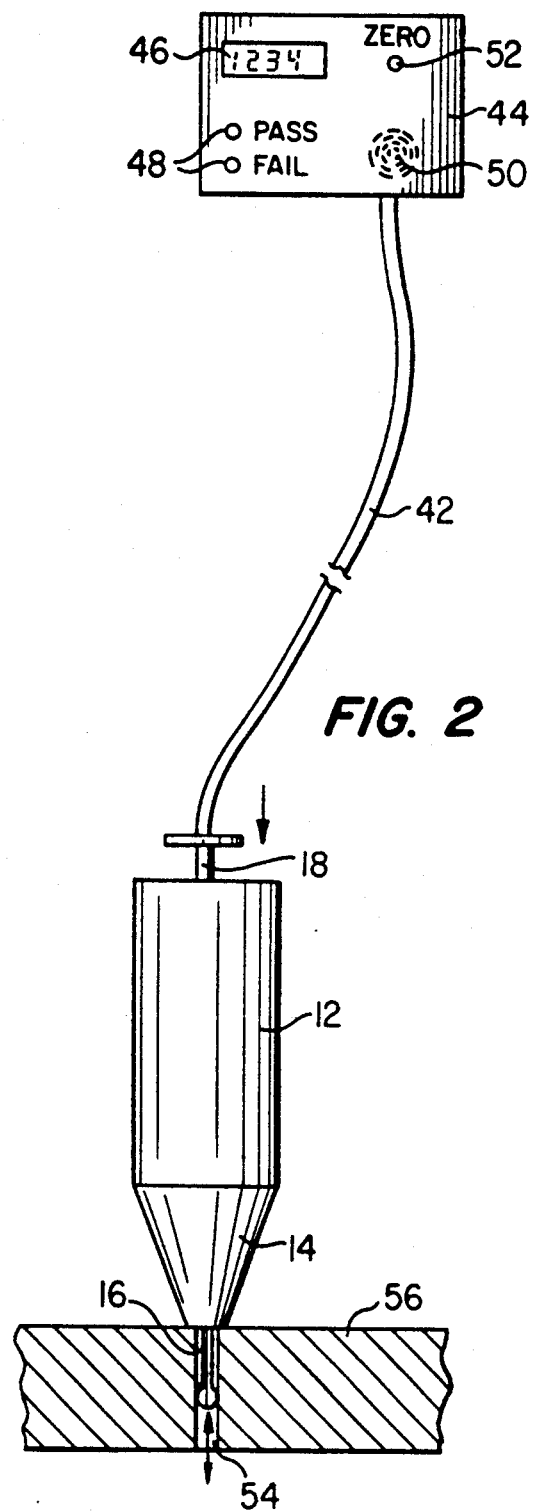

HOLE PROFILE GAGING SYSTEMS

FIELD OF THE INVENTION

The invention relates to a hole profile gage for determining the profile of a cylindrical bore. The invention is particularly adapted for determining whether the hole has any chips or flaws along its inner surface and whether the hole as drilled is within necessary tolerance limits.

BACKGROUND

The invention provides a portable profile gage that senses the profile of a bore drilled through one or more layers of material and determines whether the bore is within required tolerance limits. The profile gage has great advantages over devices previously known in the art as it is hand held, easy to use, and provides a quick and accurate determination of whether a hole meets the required specifications.

The invention is particularly useful in operations where holes for rivets or other fasteners are drilled through one or more layers of material. Drilling holes through layers of different materials, and especially through stacks of composite materials and titanium, can be troublesome as the drill may chip or gouge one layer as it enters a second layer. Most fasteners are able to endure some flaws in the side surfaces of the drilled holes, but typical engineering specifications require that the overall sidewall surface of the hole be within 70-90% of the desired specification in order to ensure adequate support and resistance to shear forces on the shank of the fastener. Less than 70% contact between the fastener and the walls of the bore can result in lower joint fatigue endurance. If the hole is not within the desired tolerance range, corrective action must be taken before the fastener is inserted.

In automated drilling operations, it is difficult for the operator to determine accurately whether the inner surfaces of a bore are within acceptable tolerances simply by inspection. Some gaging device is necessary to provide an accurate profile. U.S. Pat. No. 4,290,204 to Possati describes a plug gage with "feelers" that move radially and contact the internal walls of a bore. U.S. Pat. No. 4,112,355 to Gibson et al. discloses a capacitance measuring device for detecting the quality and fit of tapered fastener holes. U.S. Pat. No. 3,757,569 to O'Brien et al. discloses a flaw or chip detector in which the gaging head is a roller element that moves over the internal surface of the bore. These devices are complicated and work in a different manner from the device of the present invention. The present invention provides a device that is easy and simple to operate and that quickly and accurately determines the profile of a hole and whether the hole is within prescribed tolerance limits.

SUMMARY OF THE INVENTION

The present invention provides an automated hole profile gage that measures the diameter of a hole at increments along its depth to develop a hole profile. In a preferred embodiment, a probe is inserted and automatically withdrawn from the hole and the measurements are taken as the probe is being withdrawn. The data is analyzed by a processor which compiles the data, generates a profile, and determines whether the hole is within acceptable tolerance limits. The hole profile gage of the present invention comprises probe means for sensing the contour of a cylindrical bore and outputting an electrical signal, extension means for extending the probe means beyond the housing of the gage and into the bore, retraction means for retracting the probe means through the bore, and processing means for receiving the electrical output from the probe means, computing the profile for the bore and determining whether it meets the necessary tolerance limits for the particular type of fastener to be used. In a preferred embodiment, the probe means comprises a split ball probe which is connected to a transducer positioned within the housing of the gage. The transducer senses the separation between the split portions of the probe by way of a needle inserted between the portions. Any imperfections such as chips or flaws in the wall are detected by the probe and the transducer signals the processing means.

Also in a preferred embodiment, the invention further comprises a depth sensing means for sensing the depth of the probe in the bore. The depth sensor is preferably a potentiometer connected to the probe or to the retraction means. The processing means samples the signal from the probe as well as the depth signal from the potentiometer and compiles the data to compute a profile for the hole. From this profile, the processing means computes a percentage of the data points that are within the specified tolerance limits. In a preferred embodiment, the processing means then outputs a "pass" or "fail" signal for the profile to indicate to the operator the acceptance or rejection of the bore. Preferably, the processing means are contained within a hand-held unit that also contains the display.

In use, the probe is inserted into the hole by the extension means which is preferably a plunger-type device. The plunger is released, and the probe is automatically withdrawn through the hole by the retraction means which retracts the probe at a fairly constant rate. As the probe is retracting, the processor collects data from the probe and depth sensor at timed intervals and computes the hole profile. Thus, the invention provides an easy to use apparatus that accurately determines the profile of a bore and whether it is within predetermined tolerance limits.

BRIEF DESCRIPTION OF THE DRAWINGS

For a more complete understanding of the present invention, and for further details and advantages thereof, reference is now made to the following detailed description to be read in conjunction with the accompanying drawings, wherein like reference characters denote like parts in all views and where:

FIG. 1 is a partial cutaway view of a preferred embodiment of the profile gage of the present invention;

FIG. 2 shows a preferred embodiment of the invention in use;

DETAILED DESCRIPTION

Figure 3:
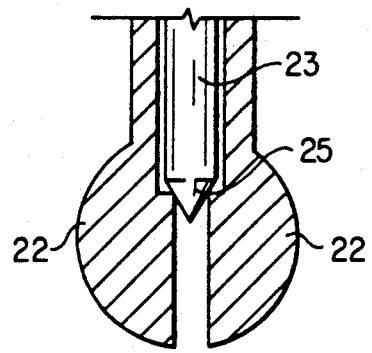
FIG. 3 is a detailed view of the sensing end of a split ball probe used in a preferred embodiment of the invention.

The hole profile gage of the present invention is particularly adapted to meet the needs of inspecting holes drilled through layers of material that are to be fastened with a rivet or other type of fastener. The profile gage develops a profile for a cylindrical bore and detects any chips or flaws along the inner surface of the bore throughout the specification and claims hole shall mean cylindrical bore. The invention is also capable of determining whether the bore is within the prescribed tolerance limits and gives a read-out such as "pass" or "fail" so that the operator can readily determine whether any corrections need to be made to the hole.

Referring now to FIGS. 1 and 2, a preferred embodiment of the profile gage of the present invention is shown therein. FIG. 1 shows a profile gage 10 comprising a housing 12 with a removable nosepiece 14, a split ball probe 16, and a plunger 18. Interposed between plunger 18 and probe 16 is transducer 20 which is connected to split ball probe 16 for sensing the relative displacements of the ball portions 22 of the probe 16. Probe 16 is mounted on guide bushing 24 and is secured in place by clamp 26. Guide bushing 24 is capable of reciprocating movement within housing 12 and is shown in the up or retracted position in FIG. 1. Plunger 18 is connected to guide bushing 24 and bushing 24 moves in association with plunger 18. Plunger 18 and bushing 24 are biased toward the up or retracted position, shown in FIG. 1, by spring 28. The extent of the retracted position of plunger 18, and thus probe 16, is controlled by depth adjustment screw 30 that restricts the retraction of plunger 18.

Mounted in housing 12 are dashpot 32 and potentiometer 34. Dashpot 32 is connected to guide bushing 24 by arm 36 while potentiometer 34 is connected to guide bushing 24 by a leg 38. Dashpot 36 serves to control the retraction of guide bushing 24, and thus probe 16, to allow retraction of probe 16 at a constant speed. Potentiometer 34 senses the position of leg 38, and thus probe 16, and outputs a signal corresponding to the longitudinal position of probe 16 in the hole. The resistance of dashpot 32 to the retraction of bushing 24 may be adjusted by dashpot adjustment screw 40.

Output signals from transducer 20 and potentiometer 34 are carried by cable 42 to a processing unit 44. As shown in FIG. 2, processing unit 44 is preferably a hand-held unit that collects the measurement data, computes the hole profile and displays a result through a visual numeric display 46, a pass/fail lamp 48, and/or an audio alarm through speaker 50. Processor unit 44 may contain other useful features such as a zero button 52 and other controls that may be useful on such a device as known in the art.

FIG. 3 shows a detailed view of probe 16 showing the preferred split ball form. As shown, probe 16 comprises hemispheric portions 22 which are separated or split by needle 23. Portions 22 are biased outward or away from each other to a slight degree to ensure contact with the wall of the bore. The inner surfaces of portions 22 contact the conical end portion 25 of needle 23. As portions 22 contact the surface of a bore, the portions 22 move diametrically in and out in relation to each other thereby displacing needle 23 in a longitudinal manner. In other words, if one of the portions 22 contacts a chip or indent in the surface of the bore, that portion moves away from the other portion and needle 23 falls into contact with the further extended portions 22. This translation of needle 23 is detected by transducer 20 and sensed as a flaw in the surface of the bore. Transducer 20 is sensitive enough to detect the slightest movement of needle 23 as portions 22 separate. The preferred split ball probes are produced in varying sizes by the Diatest Company. Of course, more precise results are obtained with the gage of the present invention if a probe is used that is dedicated to or close to the particular diameter of the hole to be tested. The probes may be easily interchanged by removing nosepiece 14 and unscrewing probe 16.

Other types of probes may also be used in place of the split ball probe. It is preferred that the probe be capable of translating the detection of defects in the side wall to longitudinal motion that can be sensed by a transducer. Other types of probe means, however, may be used in the invention as long as the probe means are capable of sensing the contour of the inner surface of a bore and outputting signal corresponding to the sensed contour.

Figure 4:
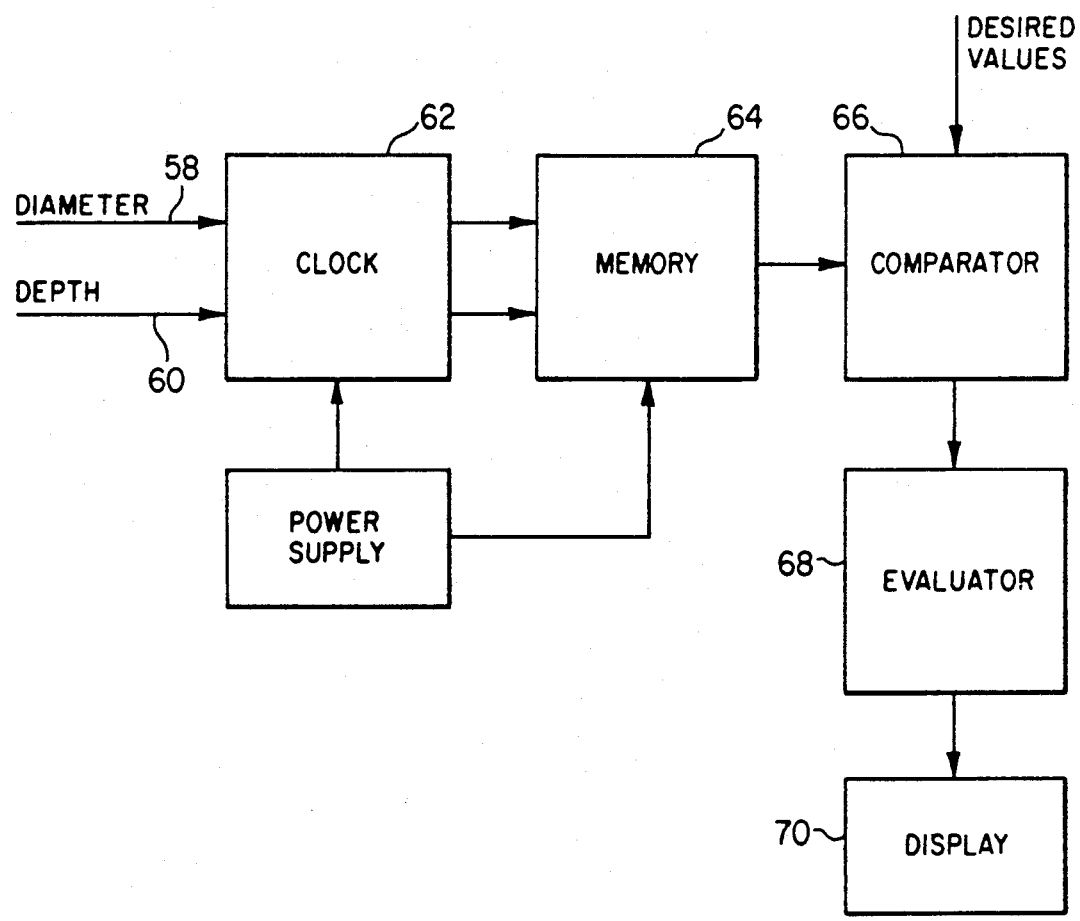
FIG. 4 is a circuit diagram for the processing unit in a preferred embodiment.

FIG. 4 illustrates a circuit diagram for processor 44. As shown, diameter input signal 58 from transducer 20 and depth input signal 60 from potentiometer 34 are sampled and admitted into memory 64 at the frequency determined by clock 62. These input values are compared to the desired value by comparator 66. The desired value is set by zeroing the system to a known diameter using a calibration ring. Comparator 66 notes the number of values comparing favorably with the desired values. Evaluator 68 then evaluates the number of values within the desired range and outputs a "pass" or "fail" indication through display 70. Additionally, the circuit may include an integrator to integrate the values and obtain a more precise profile. Processor 44 is preferably contained within a hand-held unit but may alternatively be in a larger, less mobile unit.

In use, as shown in FIG. 2, profile gage 10 is positioned over a hole 54 in sheet 56 so that probe 16 is in alignment with hole 54. Nosepiece 14 is butted against the surface of sheet 56 and plunger 18 is depressed thereby pushing probe 16 through hole 54. This action compresses spring 28 and preloads dashpot 32. Potentiometer 34 is initialized by the depression of plunger 18. As plunger 18 is released, probe 16 is retracted through hole 54 by the action of spring 28. The retraction of probe 16 is continuous, and the speed is controlled at a fairly constant rate by dashpot 32. Again, the speed of retraction may be adjusted by adjusting screw 40 on dashpot 32. Split ball probe 16 monitors the inner surface of hole 54 as probe 16 is being retracted. In essence, probe 16 monitors the diameters of hole 54 and any deviation in the diameters as it is being retracted through the hole. As probe 16 encounters any deviation in the surface of hole 54, this deviation is sensed by transducer 20 through the position of needle 23. As probe 16 is being retracted through hole 54, processor 44 repeatedly samples the output signal of transducer 20 and potentiometer 34. Thus, a profile of the inner surface of hole 54 is obtained. Processor 44 compares the data received and computes the percentage of the hole profile that is within the desired tolerance limits. If the total profile is within the desired limits, a signal is given the operator through one or more of the display features 46, 48 or 50. In this manner, the operator may readily determine whether a hole is within specified tolerances in an accurate and efficient manner.

As disclosed, the present invention provides a profile gage for testing the inner surface of a bore and determining whether it falls within desired tolerance limits. Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit and scope of the invention. Accordingly, the present invention is intended to encompass such rearrangements, modifications, and substitutions of parts and elements as falling within the spirit and scope of the present invention.

We claim:

1. A hole profile gage comprising:
   probe means for repeatedly sensing the contour of the inner surface of a hole as the probe means travels the length of the hole, and outputting a signal corresponding to the sensed contours;
   extension means for extending said probe means into said hole;
   retraction means including a dampener for retracting said probe means through said hole once the probe means are extended into said bore; and
   processing means for receiving the signal output from said probe means and computing a profile of said hole.

2. The profile gage of claim 1 wherein said probe means comprises a probe capable of translating the sensed contour into a longitudinal motion to be sensed by a transducer.

3. The profile gage of claim 2 wherein the probe is a split ball probe.

4. The profile gage of claim 1 wherein the retraction means retracts the probe means in a substantially continuous motion.

5. The profile gage of claim 1 further comprising a depth sensing means for sensing the depth of said probe means in said hole and outputting an electrical signal to said processing means.

6. The profile gage of claim 5 wherein the depth sensing means is a potentiometer.

7. The profile gage of claim 1 wherein said processing means repeatedly samples the electrical signal output by said probe means and computes a percentage of the samples that fall within a prescribed tolerance limit and further indicates to the operator by a display whether the profile of the hole is within the prescribed tolerance limit.

8. The profile gage of claim 1 wherein said extension means comprises a plunger connected to said probe means.

9. A hole profile gauge comprising:
   probe means for repeatedly sensing the contour of the inner surface of a hole as the probe means travel the length of the hole and outputting a signal corresponding to the sensed contours;
   extension means for extending said probe into said hole;
   a spring and dampening means for retracting said probe means through said hole once the probe means are extended into said hole while providing consistent retraction of said probe means through said hole; and
   processing means for receiving the signal output from said probe means and computing a profile of said hole.

10. The profile gage of claim 9 wherein said dampening means is a dashpot.

11. A hole profile gage comprising:
    a housing;
    a plunger positioned at least partially within said housing;
    a probe connected to said plunger;
    a transducer connected to said probe;
    a dampened retractor connected to said probe for retracting said probe through a hole in a substantially continuous motion, said probe sensing the surface of the hole as it is being retracted and said transducer outputting a signal corresponding to the contour of the surface; and
    a processor connected to said transducer for sampling and receiving the signal output from said transducer and for computing a profile of the inner surface of the hole.

12. The profile gage of claim 11 further comprising a depth sensor that senses the depth of said probe in the hole and outputs a signal to said processor.

13. The profile gage of claim 12 wherein said depth sensor is a potentiometer engaged with said probe.

14. The profile gage of claim 11 wherein said probe is a split ball probe.

15. The profile gage of claim 11 wherein said processor further comprises a comparator that evaluates the computed profile and determines whether it is within predetermined tolerance limits.

16. The profile gage of claim 15 further comprising a display connected to said processor that indicates the compliance of the computed profile with the predetermined tolerance limits.

17. A hole profile gauge comprising:
    a housing;
    a plunger positioned at least partially within said housing;
    a probe connected to said plunger;
    a transducer connected to said probe;
    a spring and dashpot connected to said probe for retracting said probe through a hole in a substantially continuous motion, said probe sensing the surface of the hole as it is being retracted and said transducer outputting a signal corresponding to the contour of the surface; and
    a processor connected to said transducer for sampling and receiving the signal output from said transducer and for computing a profile of the inner surface of the hole.

18. A method for determining the profile of a hole, comprising the steps of:
    moving a probe in the hole in a desired direction to a set position;
    moving said probe through the hole in an opposite direction with a substantially continuous motion due to dampening of the probe movement, said probe repeatedly sensing the contour of the inner surface of the hole as the probe moves through the length of the hole, and outputting a signal; and
    computing a profile of the hole with the signals output by the probe using a processor.

19. The method of claim 18 further comprising comparing the profile to a desired profile and determining whether the hole is within predetermined tolerance limits.

20. The method of claim 18 further comprising sensing the depth of said probe in said hole as it senses the contour of the inner surface.

21. The method of claim 18 wherein the probe comprises a split ball probe engaged with a transducer.

22. A method for determining the profile of a hole, comprising the steps of:
    extending a probe into the hole;
    retracting said probe by a spring coupled to a dampening device through the hole with a substantially continuous motion, and said probe repeatedly sensing the contour of the inner surface of the hole as the probe is retracted through the length of the hole and outputting a signal; and computing a profile of the hole from the signals output by the probe using a processor.

23. A hole profile gage, comprising:
a split ball probe for repeatedly sensing the contour of the inner surface of a hole as the probe travels the length of the hole;
a gage transducer for outputting a signal corresponding to the sensed contours;
extension means for extending said probe into said hole;
retraction means including a dampener for retracting said probe through said hole with a dampened movement once the probe is extended into said hole; and
processing means for receiving the signal output from said transducer and computing a profile of said hole.

24. A hole profile gage, comprising:
a housing;
a plunger positioned at least partially within said housing;
a split ball probe connected to said plunger;
a transducer connected to said probe;
a retractor and dampening mechanism connected to said probe for retracting said probe through a hole in a substantially continuous motion, said probe sensing the inner surface of the hole as it is being retracted, said transducer outputting a signal corresponding to the contour of the inner surface; and
a processor connected to said transducer for sampling and receiving the signal output from said transducer and for computing a profile of the inner surface of the hole.

25. A method for determining the profile of a hole, comprising the steps of:
engaging a probe moving mechanism of a hand-held gage by displacing a probe spring from its relaxed position;
disposing the gage adjacent the hole, the profile of which is to be measured;
releasing the probe for movement in the hole so that the spring longitudinally moves the probe through the hole;
dampening the movement of the probe so that substantially uniform longitudinal movement is achieved;
converting lateral movement of the probe into electrical signals representative of the contour of the hole; and
computing a profile of the hole using the electrical signals.

26. The method of claim 25, further including dampening the movement of the probe with a dashpot.

27. A method for determining the sidewall profile of a hole, comprising the steps of:
holding a hand-held profile measuring gage in a fixed position adjacent an opening of the hole;
actuating the gage so that a probe moves through the hole to a preset position, said probe being of the type having a sidewall profile measuring mechanism;
releasing the probe and associated profile measuring mechanism for movement through the hole from the preset position;
in response to the releasing of the probe from the preset position, applying a first force by the gage on the probe to move the profile measuring mechanism through the hole, and applying a second dampening force by the gage on the probe to dampen the movement of the probe to achieve an overall uniform and dampened movement of the profile measuring mechanism through the hole; and
generating a signal in response to sidewall irregularities sensed by the profile measuring mechanism during the dampened probe movement.

28. The method of claim 27, further including dampening the movement of the probe and thus the profile measuring mechanism to achieve substantially a constant velocity.

29. The method of claim 27, further including manually activating and releasing the probe of the hand held gage.

30. The method of claim 27, further including activating the probe for movement from the opening into the hole, and releasing the probe for dampened movement through the hole in a reverse direction toward said gage.

* * * * *